Patented Oct. 12, 1943

2,331,833

UNITED STATES PATENT OFFICE 2,331,833

ORGANIC ARSENIC COMPOUNDS

Cliff S. Hamilton, Lincoln, Nebr., assignor to Parke, Davis & Company, Detroit, Mich., a corporation of Michigan No Drawing. Application May 21, 1940,
Serial No. 336,440

5 Claims. (Cl. 260—440)

This invention is concerned with the formation of new organic arsenic compounds. More specifically, it relates to arsine oxides and other trivalent arsenic forms in which the arsenic is attached to the benzene ring.

Many aromatic arsine oxides have been prepared with various substituents in the benzene ring, including several of the theoretically possible isomers containing the hydroxyl and amino groups, either substituted or unsubstituted. However, several of these possible amino hydroxy aryl arsine oxide types of isomers have never been prepared and in particular, one of these has resisted preparation.

The invention is concerned more particularly with 2-hydroxy-4-amino phenyl arsine oxide and certain equivalent trivalent arsenic analogues thereof, as well as their derivatives in which the 2-hydroxy- and/or 4-amino-groups may be replaced by substituted 2-hydroxy- or substituted 4-amino-groups.

The compounds of the invention may therefore be represented by the formula,

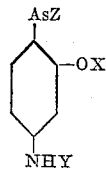

where X represents one of hydrogen, methyl or hydroxy alkyl; Y stands for hydrogen, or carboalkoxy, carboaralkoxy or the corresponding soluble amine salt group, —Y·HA, where A is an anion of an acid, HA. In the above formula, AsZ represents a member of the class —As=O, —AsCl₂,

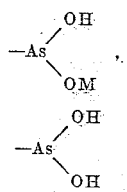

—As(—SCH₂COOM)₂ and
—As(—SCH₂·CO·NH₂)₂,

M being a soluble salt forming group such as alkali metal or ammonium or substituted ammonium radicals.

The production of arsine oxides has generally been achieved by certain well known procedures for reducing the parent arsonic acids. However, previous workers have found that the usual reducing agents cause 2-hydroxy-4-aminophenyl arsonic acid to dearsonate (split off arsenic from the organic molecule) or form polyarsenos (complex higher molecular weight reduction products). Some cases of dearsonation of this arsonic acid have been reported by Beguin & Hamilton, J. A. C. S. 61, 355 (1939).

In preparing these oxides and oxide derivatives, therefore, reaction conditions had to be sought that would not cause dearsonation to occur.

I have found that in preparing some of the compounds of this invention it is necessary to avoid the use of hydrochloric and hydrobromic acids to prevent dearsonation or formation of complex compounds of uncertain structure and composition.

I have also found that certain of the compounds of the invention may be prepared in the presence of hydrochloric or hydrobromic acid without causing dearsonation or like undesirable reaction.

The compounds of the invention are valuable for chemotherapeutic purposes and also as intermediates for the preparation of compounds intended for such purposes. The invention also includes new compounds which were previously unknown.

The invention is illustrated by the following examples.

EXAMPLE 1.—*2-hydroxy-4-aminophenylarsine oxide*

Five grams of 2-hydroxy-4-aminophenylarsonic acid are dissolved in 100 ml. of 2N sulfuric acid by warming, 0.1 g. of potassium iodide added and the solution saturated with sulfur dioxide for six hours. After standing overnight the solution is boiled under reduced pressure to remove the excess sulfur dioxide, keeping the temperature under 40° C. The solution is then made alkaline with ammonia water and taken to dryness on a steam bath under reduced pressure. The solid material is triturated with water and the suspended oxide filtered from the solution of inorganic salts. The oxide obtained in this way is nearly pure. The oxide may be purified further by solution in an appropriate alkaline media such as sodium carbonate or sodium hydroxide, charcoaling, filtering and re-isolating by neutralizing with sulfuric acid, making slightly alkaline with ammonia water, evaporating to dryness, then dissolving out the inorganic salts. The pure oxide does not show decomposition under 300° and has the formula,

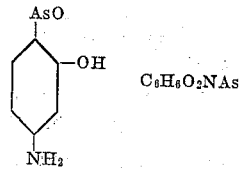

$C_6H_6O_2NAs$

The amount of arsenic required by theory is 37.65%. The amount found by analysis is 37.74%.

EXAMPLE 1a.—*Sulfate salt of 2-hydroxy-4-aminophenylarsine oxide*

Two grams of pure 2-hydroxy-4-aminophenylarsine oxide are dissolved in 15 ml. of 60% sulfuric acid by warming and the solution cooled in an ice-salt bath. The sulfate precipitates in a crystalline form which decrepitates on drying. The salt decomposes over a range of temperature but when pure is stable to 225° C. It is believed to have the formula,

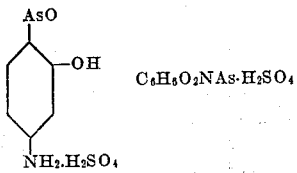

$C_6H_8O_2NAs \cdot H_2SO_4$

The amount of arsenic required by theory is 25.4%. Analysis shows the compound to contain 25.5% arsenic.

EXAMPLE 1b.—*Sodium salt of 2-hydroxy-4-aminophenylarsine oxide*

Three grams of 2-hydroxy-4-aminophenylarsine oxide are dissolved in 15 ml. of N sodium hydroxide and 55 ml. of ethyl alcohol added. The sodium salt forms on standing. It is filtered off and dried, giving a grey-white powder.

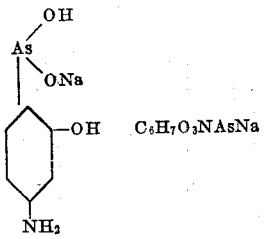

$C_6H_7O_3NAsNa$

The theory requires 33.6% arsenic. 33.5% arsenic was found.

EXAMPLE 2.—*2-hydroxy-4-carbethoxyaminophenylarsine dichloride*

Two grams of 2-hydroxy-4-carbethoxyaminophenylarsonic acid are suspended in 40 ml. of anhydrous ether. The suspension is cooled in an ice bath and stirred with the addition of a slight excess of phosphorus trichloride. The ether solution is decanted from the metaphosphoric acid formed, filtered and the ether removed by evaporation under reduced pressure. The dichloroarsine is left as a viscous oil. The constitution is established by hydrolyzing quantitatively to the oxide.

EXAMPLE 3.—*2-hydroxy-4-carbo-n-propoxyaminophenylarsine dichloride*

This compound is prepared in a manner essentially identical to Example 2 from 2-hydroxy-4-carbo-n-propoxyaminophenyl arsenic acid.

EXAMPLE 4.—*2-hydroxy-4-carbobenzoxyphenylarsine dichloride*

This compound is formed by the reaction of Example 2 on 2-hydroxy-4-carbobenzoxyaminophenylarsonic acid.

EXAMPLE 5.—*2-hydroxy-4-carbethoxyaminophenylarsine oxide*

The ether solution of the dichlorarsine of Example 2 (2-hydroxy-4-carbethoxyaminophenylarsine dichloride) is shaken with 50 ml. of water, the ether evaporated and the curdy, white oxide filtered off and dried. It is sufficiently pure for most purposes. It may be purified further by solution in alkali, charcoaling, filtering and reprecipitating with acid. The compound forms a white powder melting at 161° C.

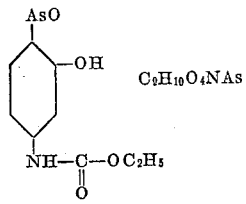

$C_9H_{10}O_4NAs$

Analysis shows the compound to contain 27.92% arsenic. The formula above requires 27.63% arsenic.

EXAMPLE 6.—*2-hydroxy-4-carbo-n-propoxyaminophenylarsine oxide*

The ether solution of the dichlorarsine of Example 3 is treated as in Example 5 giving 2-hydroxy-4-carbo-n-propoxyaminophenylarsine oxide, a white powder, M. P. 201° C.

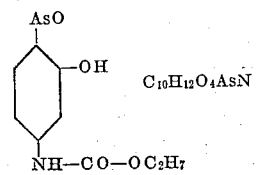

$C_{10}H_{12}O_4AsN$

This compound contains 26.58% arsenic as compared to 26.28% required by the formula.

EXAMPLE 7.—*2-hydroxy-4-carbobenzoxyaminophenylarsine oxide*

The ether solution of dichlorarsine of Example 4 is treated as in Example 5. The white oxide melts at 217–219°.

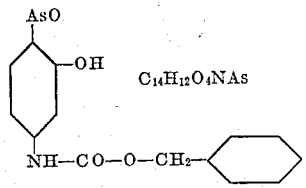

$C_{14}H_{12}O_4NAs$

The compound contains 22.47% arsenic. The formula requires 22.49% arsenic.

EXAMPLE 8.—*2-β-hydroxyethoxy-4-aminophenylarsine oxide*

Three grams of 2-β-hydroxyethoxy-4-amino phenylarsonic acid are suspended in 75 ml. of water and 75 ml. of 6N sulfuric acid added to give a clear solution. The solution is saturated with sulfur dioxide for 6 hours after the addition of 0.1 gram of potassium iodide. On neutralizing with ammonia water and allowing to stand overnight the oxide may be obtained as a white crystalline product, containing water of hydration and which melts with foaming around 100° C.

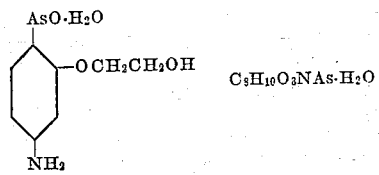

$C_8H_{10}O_3NAs \cdot H_2O$

The product contains 28.95% arsenic as compared to a theory of 28.72% required by the formula.

2-β-hydroxypropoxy-4-aminophenylarsine oxide

This oxide is obtained in the same manner as the ethoxy compound from 2-β-hydroxypropoxy-4-aminophenylarsonic acid. It crystallizes with water of crystallization in white plates which foam with loss of water around 90° C.

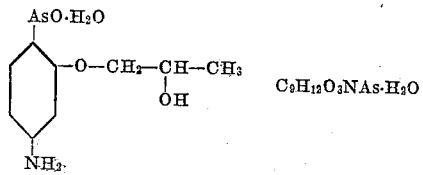

This compound contains 27.1% As by analysis whereas the formula requires 27.3%.

EXAMPLE 9.—*2-β-hydroxyethoxy-4-carbethoxy-aminophenylarsine oxide*

One gram of 2-β-hydroxy-4-carbethoxyaminophenylarsonic acid is dissolved in 25 ml. of alcohol and 25 ml. of water, 25 ml. of 60% sulfuric acid and 0.1 g. of potassium iodide added. Sulfur dioxide is passed through the solution for two hours and the solution allowed to stand overnight. The solution is neutralized with ammonia water and the alcohol removed by distilling in vacuo. On cooling the aqueous solution the white oxide precipitates, M. P. 220°.

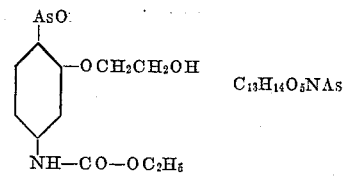

The formula requires 22.10% arsenic, the product analyzes for 22.04%.

In this same manner other like compounds such as 2-β-hydroxypropoxy-4-carbethoxyaminophenylarsonic acid and 2-β-hydroxyethoxy-4-carbobenzoxy-aminophenylarsonic acid can be reduced to their respective oxides.

2-β-hydroxypropoxy-4-carbethoxyaminophenylarsine oxide.

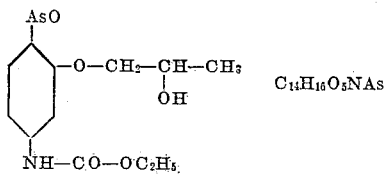

M. P. 172°, white, 21.14% arsenic found (the formula requires 21.22%); and

2-β-hydroxyethoxy-4-carbobenzoxyaminophenylarsine oxide.

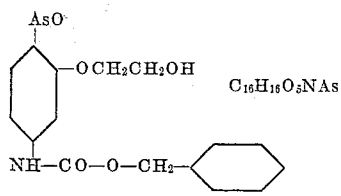

M. P.>250°, white, 19.52% arsenic (the formula requires 19.60%).

EXAMPLE 10.—*2-methoxy-4-carbethoxyaminophenylarsine oxide*

One gram of 2-methoxy-4-carbethoxyaminophenylarsonic acid is suspended in ether at room temperature and 0.5 ml. of phosphorus trichloride added slowly with stirring. After standing one hour, the ether is removed by evaporation in a current of air and the oxide filtered off. The oxide may be purified by solution in alkaline media, filtering and reprecipitating with acid. The oxide is a white compound melting at 147°.

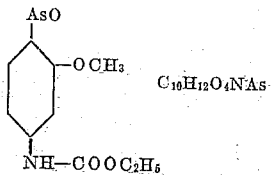

The formula requires 26.3% arsenic, 26.1% was found.

EXAMPLE 11.—*Preparation of the thioglycollates of the arsine oxides*

One hundredth mol of the arsine oxide is dissolved in 3 ml. of water containing 0.02 mole of sodium hydroxide. Two hundredths mol (1.84 g.) of thioglycollic acid is added and the solution shaken well. The solution is then diluted to 25 ml. with absolute ethyl alcohol and then to 50 ml. with dry ether. The disodium salt of the thioglycollate precipitates as a white material, in some cases crystalline. By this method the disodium dithioglycollates of the following oxides are prepared:

1. 2-hydroxy-4-aminophenylarsine oxide.
2. 2-hydroxy-4-carbethoxyaminophenylarsine oxide.
3. 2-hydroxy-4-carbo-n-propoxyaminophenylarsine oxide.
4. 2-hydroxy-4-carbobenzoxyaminophenylarsine oxide.
5. 2-β-hydroxyethoxy-4-carbethoxyaminophenylarsine oxide.
6. 2-β-hydroxypropoxy-4-carbethoxyaminophenylarsine oxide.
7. 2-methoxy-4-carbethoxyaminophenylarsine oxide.
8. 2-β-hydroxyethoxy-4-carbobenzoxyaminophenylarsine oxide.
9. 2-β-hydroxyethoxy-4-aminophenylarsine oxide.
10. 2-β-hydroxypropoxy-4-aminophenylarsine oxide.

EXAMPLE 12.—*Thioglycolamide derivatives of oxides*

By substituting thioglycolamide for the thioglycollic acid used in Example 11, the dithioglycolamide derivatives of the oxides of Example 11 as well as of other oxides of the invention can be obtained.

The examples above given are merely illustrative of the invention which can be practiced while employing numerous variations of the materials and conditions given in detail in the examples, without departing from the essential features of the invention as described. The variations mentioned will be apparent to those skilled in the art of preparing organic arsenicals.

Examples 1, 8 and 9 give conditions which make it possible for the first time to obtain 2-hydroxy-4-amino-phenyl arsinoxide and derivatives thereof. One of the main features of the process used in the three examples mentioned is to use a strong mineral acid other than hydrochloric or hydrobromic acids during the reduction of the arsonic acid. I prefer to use a concentration of acid ranging from about 2 normal to 6 normal, since the rate of reaction is extremely slow below 2 N and at this concentration large quantities of unreacted arsonic acid are recovered from the reaction mixture, even after a period of several days. In the higher concentrations the reaction progresses more rapidly, but if the concentration is too high, there will be too much decomposition and formation of undesired byproducts.

The method used in Examples 1, 8 and 9 is quite sensitive to iodide concentration. With minute quantities of iodide the reaction proceeds very slowly. On the other hand, if the iodide concentration is too high, nuclear substitution of the arsonic acid occurs. I therefore prefer a concentration of iodide, such as potassium iodide, of not more than about 0.2 grams/100 ml. of solution. The optimum value is around 0.1 grams/100 ml.

The arsine oxide compounds are rather sensitive to temperatures which are too high. I therefore prefer to work with these compounds, not only in the reaction mixture in which they are produced but also when further treating them, for example, during purification, at temperatures below about 40° C. in the presence of acid media and below about 80° C. in the presence of alkalies.

In those examples, such as 2 and 10, where phosphorus trichloride is used for reducing the arsonic acid, one can substitute phosphorus tribromide for the phosphorus trichloride. In that case the corresponding dibromo arsine compounds are obtained. However, phosphorus triiodide is not as satisfactory since reduction of the arsonic acid goes beyond the dihalo arsine stage.

When converting the dihalo arsine compounds into their arsine oxide derivatives one can use various aqueous liquids, such as quite dilute ammonium hydroxide or dilute alkaline solutions.

The dearsonation, already mentioned, which occurs when a hydrohalic acid is present with the arsine oxide compounds makes it impractical to try to prepare hydrohalic acid salts of those arsine oxides having a free or unprotected ortho hydroxyl group. Preparation of salts of these free hydroxy derivatives with oxidizing acids, e. g. nitric acid, is also impractical because of the oxidizing action of such acids on the new arsine oxides. I therefore prefer the new class of free hydroxy substituted arsine oxides of this invention and their equivalent trivalent arsenic derivatives of the formula,

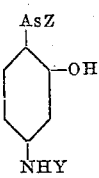

where Z has the same values as already given for the general formula, while Y stands for hydrogen, or carboalkoxy, carboaralkoxy or the corresponding soluble amine salt group, —Y·HA, where A is an anion of a non-hydrohalic non-oxidizing organic or inorganic acid, HA.

What I claim is:

1. Organic arsenic compounds of the formula,

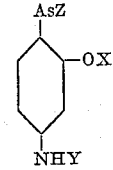

where X is a member of the class hydrogen, methyl and hydroxyl alkyl, Y is a member of the class hydrogen, carboalkoxy, carboaralkoxy and soluble amine salt groups, —Y·HA, where A is an anion of an acid which does not chemically alter the group AsZ and AsZ represents a member of the class —As=O, AsCl$_2$,

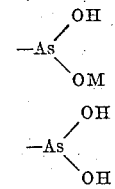

—As(—SCH$_2$COOM)$_2$ and —As(—SCH$_2$·CO·NH$_2$)$_2$

M being a soluble salt forming group.

2. Organic arsenic compounds of the formula,

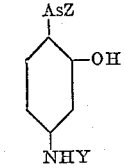

where Y represents a member of the class hydrogen, carboalkoxy, carboaralkoxy and the soluble amine salt groups, —Y·HA, where A is an anion of an acid which does not chemically alter the group AsZ and AsZ represents a member of the class —As=O, —AsCl$_2$,

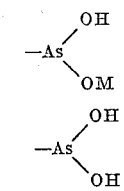

—As(—SCH$_2$COOM)$_2$ and —As(—SCH$_2$·CO·NH$_2$)$_2$

M being a soluble salt forming group.

3. A 2-hydroxy-4-carboalkoxy amino phenyl arsine oxide.

4. 2-hydroxy-4-carbethoxy amino phenyl arsine oxide.

5. 2-hydroxy-4-amino phenyl arsine oxide.

CLIFF S. HAMILTON.